United States Patent
Zu et al.

(10) Patent No.: US 10,944,313 B2
(45) Date of Patent: Mar. 9, 2021

(54) SELF-ADAPTIVE CONTROL MINIATURE MOTOR

(71) Applicant: GOERTEK INC.

(72) Inventors: Fenglei Zu, WeiFang (CN); Chunfa Liu, WeiFang (CN)

(73) Assignee: GOERTEK INC., Shandong (CN)

(*) Notice: Subject to any disclaimer, the term of this patent is extended or adjusted under 35 U.S.C. 154(b) by 256 days.

(21) Appl. No.: 15/758,879

(22) PCT Filed: Dec. 15, 2015

(86) PCT No.: PCT/CN2015/097418
§ 371 (c)(1),
(2) Date: Mar. 9, 2018

(87) PCT Pub. No.: WO2017/049775
PCT Pub. Date: Mar. 30, 2017

(65) Prior Publication Data
US 2018/0287477 A1    Oct. 4, 2018

(30) Foreign Application Priority Data
Sep. 24, 2015  (CN) .......................... 201510618082.0

(51) Int. Cl.
H02K 33/18    (2006.01)
H02P 25/032   (2016.01)
(Continued)

(52) U.S. Cl.
CPC ............. *H02K 33/18* (2013.01); *A63F 13/24* (2014.09); *A63F 13/285* (2014.09); *H02K 33/16* (2013.01);
(Continued)

(58) Field of Classification Search
CPC ....... H02K 33/18; H02K 33/16; H02P 25/032
See application file for complete search history.

(56) References Cited

U.S. PATENT DOCUMENTS 5,621,294 A * 4/1997 Bessette ............... H02P 25/098
                                                    318/573
6,181,090 B1 * 1/2001 Amaya .................. H02K 33/16
                                                    310/50
(Continued)

FOREIGN PATENT DOCUMENTS

CN    1243355 A    2/2000
CN    1367576 A    9/2002
(Continued)

OTHER PUBLICATIONS

Office Action from Chinese Patent Office for CN 201510618082.0 dated May 16, 2017.
(Continued)

*Primary Examiner* — Bickey Dhakal
(74) *Attorney, Agent, or Firm* — Muir Patent Law, PLLC

(57) ABSTRACT

A self-adaptive control miniature motor comprises a driving unit (200), a mover (300) and a self-adaptive control unit (100). The driving unit comprises a fixed stator and a movable vibration block, and provides the driving force for the reciprocating motion of the mover through the interaction between the stator and the vibration block. The mover is a forced vibration part, and is driven by the movable vibration block of the driving unit to do the reciprocating motion. The self-adaptive control unit is used for controlling a motion state of the mover in real time by adjusting a force applied on the mover, based on a feedback information of the motion state of the mover. The self-adaptive control miniature motor, by combining the motor hardware with a control circuit, facilitates real-time adjustment of the magnetic field intensity in the motor, thus improving the stability of the vibration of the motor.

12 Claims, 9 Drawing Sheets

(51) Int. Cl.
  *H02K 33/16*   (2006.01)
  *A63F 13/24*   (2014.01)
  *A63F 13/285*  (2014.01)
  *G06F 3/01*    (2006.01)

(52) U.S. Cl.
  CPC ............ *H02P 25/032* (2016.02); *G06F 3/016* (2013.01); *G06F 2203/013* (2013.01)

(56) References Cited

U.S. PATENT DOCUMENTS

| | | | | |
|---|---|---|---|---|
| 6,977,474 B2 * | 12/2005 | Ueda | ...................... | B26B 19/282 |
| | | | | 318/128 |
| 7,919,945 B2 | 4/2011 | Houston et al. | | |
| 8,624,449 B2 * | 1/2014 | Kim | ...................... | H02K 33/18 |
| | | | | 310/25 |
| 2005/0275294 A1 * | 12/2005 | Izumi | ...................... | H02K 33/16 |
| | | | | 310/15 |
| 2006/0290662 A1 | 12/2006 | Houston et al. | | |
| 2012/0170792 A1 | 7/2012 | Li et al. | | |
| 2016/0211735 A1 * | 7/2016 | Mao | ...................... | H02K 33/16 |

FOREIGN PATENT DOCUMENTS

| | | |
|---|---|---|
| CN | 1716756 | 1/2006 |
| CN | 1770606 | 5/2006 |
| CN | 103348573 | 10/2013 |
| CN | 204392055 | 6/2015 |
| CN | 204967593 | 1/2016 |

OTHER PUBLICATIONS

Office Action from Chinese Patent Office for CN 201510618082.0 dated Dec. 21, 2017.

* cited by examiner

SELF-ADAPTIVE CONTROL MINIATURE MOTOR

TECHNICAL FIELD

The present invention relates to the technical field of consumer electronics, and more particularly, to a self-adaptively controlled miniature motor applied to portable consumer electronic products.

BACKGROUND ART

With the development of communication technology, the portable electronic products, such as mobile phones, handheld game consoles or handheld multimedia entertainment devices, etc. are gradually getting closer to people's lives. In these portable electronic products, a miniature vibration motor is generally used for system feedback, such as call prompt of mobile phones, the vibration feedback of the game consoles, and so on. However, with the development trend of thinner and lighter design of electronic products, the various kinds of internal components of which also need to adapt to this trend, and the miniature linear motor is no exception.

The conventional miniature linear motor generally includes: an upper cover; a lower cover that forms a vibration space with the upper cover; a vibrator (including a counterweight block and a permanent magnet) that conducts a linear reciprocating vibration in the vibration space; an elastic support component connecting the upper cover and making the vibrator conduct the reciprocating vibration; and an electromagnet (a coil) located at a distance below the vibrator.

In the miniature linear motor of such a structure as described above, the vibration of the motor is realized mainly through the mutual cooperation of the mechanical structure. Specifically, the magnetic field generated by the coil after being energized interacts with the magnetic field generated by the permanent magnet in the vibrator, thereby promoting the vibration of the motor. The above-mentioned miniature linear motor of the conventional structure has the following defects:

1. due to the fluctuation of material size, as well as the unstable factors in the assembly process, it would result that the performance of the motor will be greatly fluctuated;

2. the response speed of the traditional miniature linear motor mainly depends on the magnitude of the instantaneous driving force and the damping; large driving force and small damping will lead to fast start and slow brake; and small driving force and large damping will lead to slow start and fast brake, as a result, requirements to start and brake cannot be satisfied simultaneously;

3. the unbalanced polarization in the vibration process of the traditional miniature linear motor cannot be avoided, and it can only be solved by space avoidance, but the space avoidance will inevitably lead to performance degradation.

SUMMARY

In view of the above problems, it is an object of the present invention to provide a self-adaptively controlled miniature motor, and the vibration state of the vibrator is controlled in real time by combining the hardware of the miniature linear motor with the control circuit and applying a self-adaptive control algorithm to the control circuit, so as to improve the performance of the motor.

The self-adaptively controlled miniature motor provided by the present invention comprises a driving unit and a mover, wherein the driving unit comprises a fixed stator and a movable vibration block, and a driving force for a reciprocating motion is provided for the mover through an interaction force between the stator and the vibration block; the mover is a forced vibration part, and does the reciprocating motion driven by the movable vibration block of the driving unit; in addition, the self-adaptively controlled miniature motor further comprises a self-adaptive control unit for controlling a motion state of the mover in real time by adjusting a force applied on the mover, according to a feedback information of the motion state of the mover.

In addition, the self-adaptive control unit comprises a control chip and a magnetic field force controllable unit, wherein the control chip is used for adjusting and controlling an external input signal according to the feedback information of the motion state of the mover and determining a real-time control signal output to the magnetic field force controllable unit; and the magnetic field force controllable unit is used for providing a real-time controlled force for the mover under the control of the control signal.

In addition, the control chip comprises: a feedback signal collecting unit for collecting a voltage signal or a current signal fed back from the mover; a difference determination unit for determining an error signal for adjusting the motion state of the mover according to the signal collected by the feedback signal collecting unit; a self-adaptive filtering unit for self-adaptively filtering the external input signal according to the error signal determined by the difference determination unit; and a power amplifying unit for performing power amplifying to the signal filtered by the self-adaptive filtering unit to output the real-time control signal to the magnetic field force controllable unit.

In addition, in a process that the difference determination unit and the self-adaptive filtering unit determine the error signal for adjusting the motion state of the mover according to the signal collected by the feedback signal collecting unit and perform self-adaptive filtering for the external input signal according to the error signal determined by the difference determination unit, the process comprises four stages of "extraction-comparison-correction-determination", wherein the difference determination unit takes the feedback information of the motion state of the mover as an input signal, and extracts a current waveform representing a current motion state of the mover in the input signal; and then, the difference determination unit compares the current waveform with a preset sine waveform, and generates the error signal output to the self-adaptive filtering unit according to a comparison result; the self-adaptive filtering unit adjusts a filtering parameter thereof according to the error signal and corrects the external input signal according to the filtering parameter; after the external input signal is corrected, it is determined whether the corrected external input signal is sufficient to adjust the motion state of the mover to a preset state, if the corrected external input signal is not sufficient to adjust the motion state of the mover to the preset state, the process comprising "extraction-comparison-correction-determination" is carried out again by taking the corrected external input signal as the feedback information of the motion state of the mover, until the corrected external input signal is sufficient to adjust the motion state of the mover to the preset state.

In addition, the control chip is a built-in circuit or a peripheral circuit of the self-adaptively controlled miniature motor.

In addition, the magnetic field force controllable unit comprises a movable part and a fixed part for applying a force on the movable part, wherein the movable part is coupled with the mover and does the reciprocating motion together with the mover, and the fixed part is stationary with respect to the stator.

In addition, the movable part is a permanent magnet, an electromagnet or a multi-turn coil that is fixedly coupled with the mover.

In addition, the vibration block comprises at least two permanent magnets disposed adjacent to each other and a magnetic conductive yoke disposed between any two adjacent permanent magnets; adjacent ends of two adjacent permanent magnets have the same polarities; the stator comprises a coil and a magnetic conductive core provided in the coil; and a magnetization direction of the permanent magnets is perpendicular to an axial direction of the coil.

In addition, the magnetic conductive yoke and the magnetic conductive core are misaligned; and a horizontal distance d between the magnetic conductive yoke and the magnetic conductive core corresponding to the magnetic conductive yoke is within a numerical range of 0.1 mm to 0.3 mm.

In addition, the stator and the vibration block are arranged in a vertical direction, and a vibration direction of the vibration block is parallel to a mounting plane of the stator.

In addition, the stator and the vibration block are arranged in a vertical direction, and a vibration direction of the vibration block is parallel to a mounting plane of the stator.

The above-mentioned self-adaptively controlled miniature motor according to the present invention jumps out of the current design concept of the motor of the inherent permanent magnets and coils. By adding the control circuit, in a way that combines motor hardware with chips and algorithms, the vibration state of the motor can be adjusted in real time, so that the vibrator has always been force balanced in the process of vibration, thus making the motor achieve a uniform balance of vibration sense.

In order to achieve the above and related objects, one or more aspects of the present invention comprise the features described below in detail and particularly pointed out in claims. The following description and the accompanying drawings set forth in detail certain illustrative aspects of the present invention. However, these aspects indicate only some of the various ways in which the principles of the present invention may be employed. In addition, the present invention is intended to comprise all such aspects as well as their equivalents.

BRIEF DESCRIPTION OF DRAWINGS

By reference to the following description taken in conjunction with the accompanying drawings and the contents of claims, and with a more complete understanding of the present invention, other objects and results of the present invention will become more apparent and more readily appreciated. In the accompanying drawings:

The same reference numbers in all of the drawings indicate similar or corresponding features or functions.

DETAILED DESCRIPTION OF EMBODIMENTS

In the following description, for the purposes of explanation, numerous specific details are set forth in order to provide a thorough understanding of one or more embodiments. However, it is apparent that these embodiments may be practiced without these specific details. In other examples, the well-known structures and devices are illustrated in the form of a block diagram for the convenience of describing one or more embodiments.

In order to explain the technical solutions of the present invention more clearly, some concepts involved in the present invention are firstly described below.

Mover, which refers to the part of the motor that is forced to vibrate, can also be called "counterweight block" or "mass block". The mover is a high-quality, high-density metal block that enhances the vibration balance and can be driven by the driving unit and the magnetic field force controllable unit so as to do the reciprocating motion.

The driving unit, which is an inherent part inside the conventional motor structure, comprises a fixed stator and a movable vibration block. Wherein, the stator may be a fixed coil or electromagnet, and the vibration block comprises a permanent magnet. The driving unit provides the driving force for the reciprocating motion of the mover by the interaction force of the coil or electromagnet and the permanent magnet.

The magnetic field force controllable unit, which is an auxiliary structure arranged inside the motor and is mainly divided into a fixed part and a movable part. The fixed part applies a force (mainly a magnetic field force) on the movable part, and the movable part is fixedly coupled with the mover and vibrates together with the mover; and the motion state of the mover can be controlled by adjusting the force applying on the movable part.

The specific embodiments of the present invention will be described in detail below with reference to the accompanying drawings.

In order to solve the problem of vibration sense imbalance caused by the unitary coil control mode in the existing miniature vibration motor structure, a self-adaptively controlled miniature motor provided by the invention combines the hardware of the motor and the control circuit to control the vibration state of the motor in real time. Specifically, FIG. 1 and FIG. 2 respectively show an overall exploded structure and a combined structure of a self-adaptively controlled miniature motor according to an embodiment of the present invention.

Figure 1:
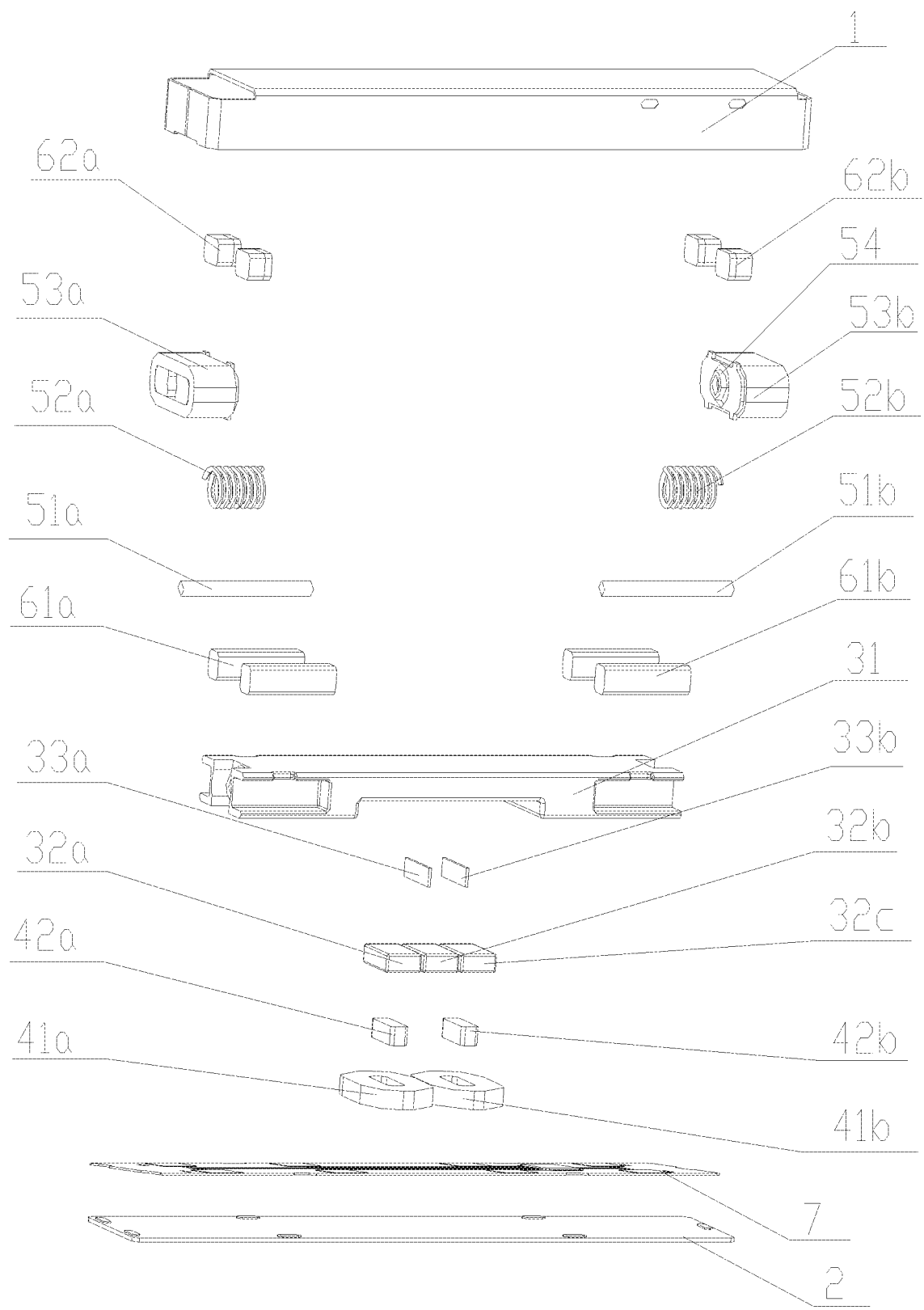
FIG. 1 is a schematic diagram of an overall exploded structure of a self-adaptively controlled miniature motor according to an embodiment of the present invention.
Figure 2:
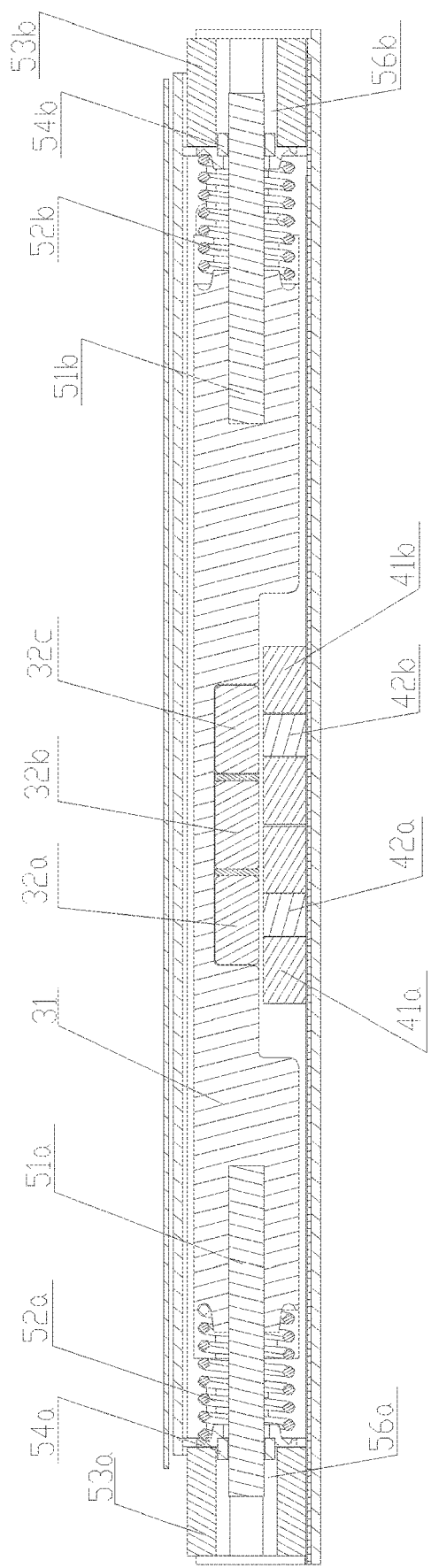
FIG. 2 is a schematic diagram of a combined structure of a self-adaptively controlled miniature motor according to an embodiment of the present invention.

As shown together in FIG. 1 and FIG. 2, a self-adaptively controlled miniature motor of the present embodiment mainly comprises a housing, an vibrator and a stator. The stator and the vibrator are arranged in a vertical direction, and the stator is stationary relative to the housing. Wherein, the housing comprises an upper housing 1 and a back cover 2; the vibrator comprises a counterweight block 31 and a vibration block, with respect to the stationary stator, the vibration block is a movable part in a driving unit that provides a driving force for the self-adaptively controlled miniature motor, and the vibration block consists of three permanent magnets 32a, 32b, 32c disposed adjacent to each other, and the magnetic conductive yokes 33a and 33b disposed between adjacent permanent magnets, respectively; the stator comprises two coils 41a, 41b arranged corresponding to the vibrator and the iron cores 42a and 42b respectively provided in the coils. The magnetic conductive yokes and the magnetic conductive cores are alternately arranged, and each of the magnetic conductive cores is located at a side of the corresponding magnetic conductive yoke away from the center of the vibrator. The "corresponding" refers to the magnetic conductive core/magnetic conductive yoke which can influence each other and change the direction of the magnetic field line. In the drawings, the alternating arrangement of the magnetic conductive yokes and the magnetic conductive cores is as follows: the magnetic conductive core 42a, the magnetic conductive yoke 33a, the magnetic conductive yoke 33b, the magnetic conductive core 42b, in which the magnetic conductive core 42a corresponds to the magnetic conductive yoke 33a, and the magnetic conductive yoke 33b corresponds to the magnetic conductive core 42b. The counterweight block 31 can be made of high-density metal material such as tungsten steel block or nickel steel block or nickel-tungsten alloy to increase the vibration force and make the vibration of the electronic product stronger.

In the embodiment shown in FIGS. 1 and 2, the vibration block and the stator constitute the driving unit of the self-adaptively controlled miniature motor of the present invention, the counterweight block 31 is the mover that is forced to vibrate, and the movable vibration block in the driving unit is subject to the effect of the magnetic field force of the fixed stator to drive the mover to do reciprocating motion.

In addition, a self-adaptive control unit (not shown) is also provided in the self-adaptively controlled miniature motor for controlling the motion state of the mover in real time by adjusting the force applied on the mover, based on the feedback information of the motion state of the mover. The self-adaptive control unit can be a built-in circuit of the self-adaptively controlled miniature motor, or can be arranged on the outside of the self-adaptively controlled miniature motor as a peripheral circuit.

Figure 3:
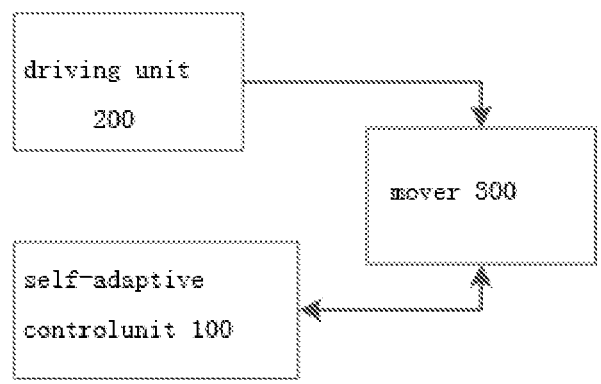
FIG. 3 is logical structure of a self-adaptively controlled miniature motor according to an embodiment of the present invention.
Figure 4:
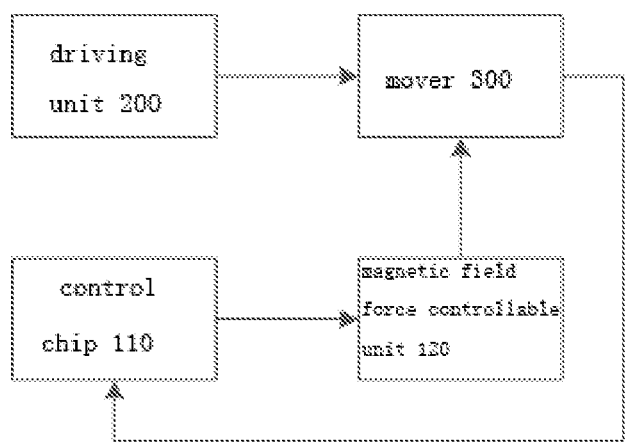
FIG. 4 is logical structure of a self-adaptively controlled miniature motor according to another embodiment of the present invention.

Specifically, FIGS. 3 and 4 respectively show the logical structure of the self-adaptively controlled miniature motor according to the embodiment of the present invention from different angles.

As shown together in FIG. 3 and FIG. 4, a self-adaptively controlled miniature motor provided by the present invention comprises a self-adaptive control unit 100, a driving unit 200 and a mover 300, wherein the driving unit 200 comprises a fixed stator and a movable vibration block, and the driving force of reciprocating motion is provided to the mover by the interaction force between the stator and the vibration block; the mover 300 is a forced vibration part, which is driven by the movable vibration block of the driving unit 200 to do the reciprocating motion; the self-adaptive control unit 100 controls the motion state of the mover 300 in real time by adjusting the force applied on the mover 300, based on the feedback information of the motion state of the mover 300.

Wherein, the self-adaptive control unit 100 comprises a control chip 110 and a magnetic field force controllable unit 120, wherein the control chip 110 can receive an external input signal and the feedback information of the motion state of the mover 300, and adjusts and controls the external input signal according to the feedback information of the motion state of the mover 300 and determines the real-time control signal output to the magnetic field force controllable unit 120; and the magnetic field force controllable unit 120 is connected between the control chip 110 and the mover 300 and is used for providing a real time control force for the mover 300 under the control of the control signal output by the control chip 110.

Figure 5:
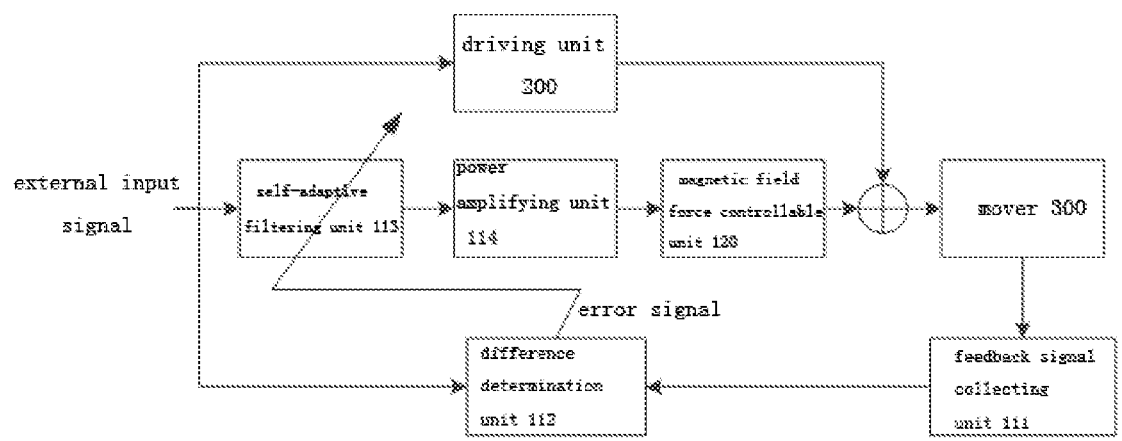
FIG. 5 is principle block diagram of a self-adaptively controlled miniature motor according to another embodiment of the present invention.

FIG. 5 is principle block diagram of a self-adaptively controlled miniature motor according to another embodiment of the present invention.

In the embodiment shown in FIG. 5, the control chip further comprises a feedback signal collecting unit 111, a difference determination unit 112, a self-adaptive filtering unit 113 and a power amplifying unit 114. Wherein, the feedback signal collecting unit 111 is used for collecting the voltage or current signal fed back from the mover 300; the difference determination unit 112 is used for determining the error signal for adjusting the motion state of the mover according to the signal collected by the feedback signal collecting unit 111; the self-adaptive filtering unit 113 is used for self-adaptive filtering of the external input signal according to the error signal determined by the difference determination unit 112; and the power amplifying unit 114 is used for power amplifying of the signal filtered by the self-adaptive filtering unit 113 to output a real-time control signal to the magnetic field force controllable unit.

As shown in FIG. 5, after the external input signal is input to the self-adaptively controlled miniature motor, the driving unit immediately drives the mover 300 to reciprocate in a predetermined direction, at the same time, the feedback signal collecting unit 111 collects the feedback information (i.e., the voltage or current signal of the mover 300) that is fed back by the mover 300 and can reflect the motion state of the mover 300. The difference determination unit 112 calculates the difference between the current motion state of the mover 300 and the control object (the expected motion state of the mover 300) based on the feedback information, so as to determine the error signal for adjusting the motion state of the mover. The self-adaptive filtering unit 113 self-adaptively filters the external input signal according to the error signal, the filtered signal is amplified by the power amplifying unit 114 and output to the magnetic field force controllable unit 120, the motion of the mover 300 is driven by the magnetic field force controllable unit 120 and the driving unit 200 together. At this time, a real-time control of the motion state of the mover by the self-adaptive control unit is realized.

In the above-mentioned real-time control process, the magnetic field force controllable unit 120 directly applies force to the mover 300, so the magnetic field force controllable unit 120 is arranged inside the self-adaptively controlled miniature motor. In a specific embodiment of the present invention, the magnetic field force controllable unit 120 comprises a movable part and a fixed part for applying a force to the movable part; wherein the movable part is combined with the mover and reciprocates together with the mover, for example, the movable part may comprise several permanent magnets, electromagnets or multi-turn coils which are fixed-point fixed on the counterweight block. And the fixed part is stationary relative to the stator, and may be a permanent magnet or an electromagnet or a multi-turn coil fixed inside the self-adaptively controlled miniature motor, alternatively, the stator of the self-adaptively controlled miniature motor itself can be used as the fixed part of the magnetic field force controllable unit.

Since the conventional miniature linear motor only realizes the vibration of the motor through the cooperation of the mechanical structures, the center axis distance between the stator and the vibration block in the driving unit varies with vibration, thus the magnitude of the driving force is affected, that is, the vibration of the mover driven by the vibration block in the motor is actually nonlinear. In the present invention, the driving force on the mover is adjusted in real time in accordance with the feedback information of the current motion state of the mover, so as to adjust the vibration of the mover from non-linear motion to linear motion, thereby effectively improving the stability of the vibration.

Figure 6:
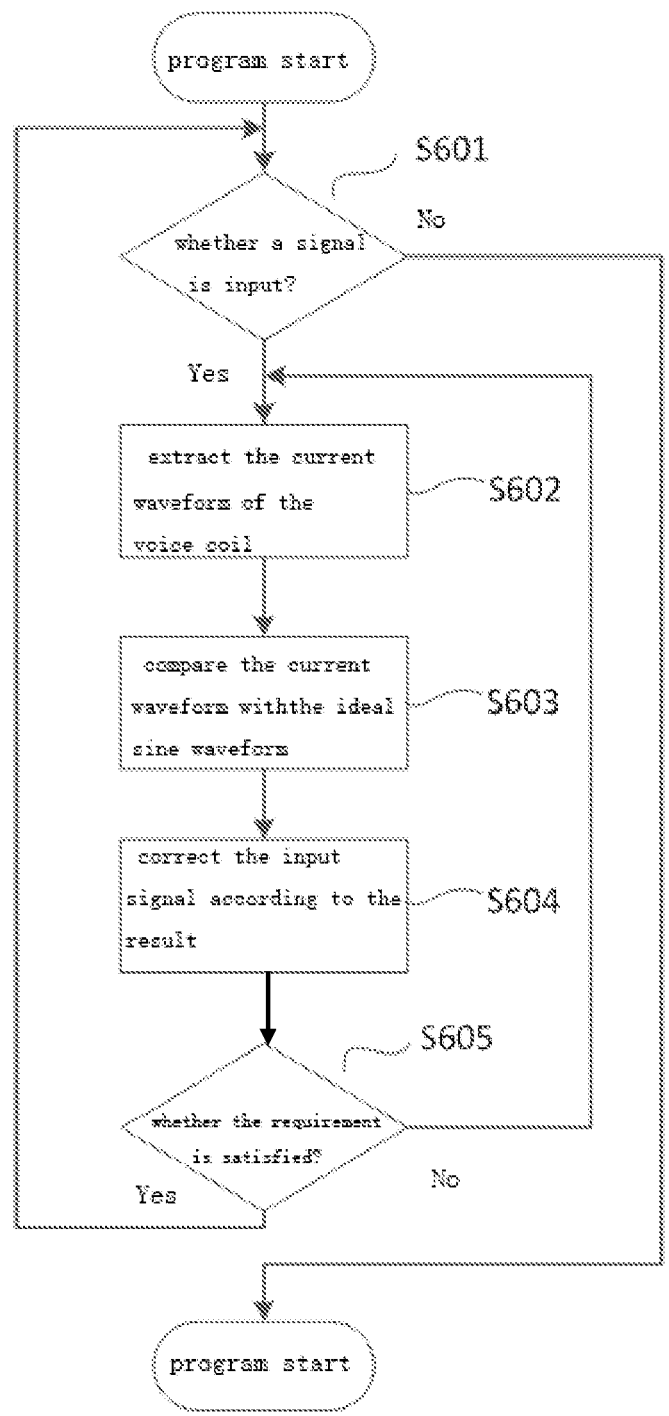
FIG. 6 is a schematic diagram of a process of adjusting nonlinear motion according to an embodiment of the present invention.

FIG. 6 illustrates a process of adjusting nonlinear motion according to an embodiment of the present invention.

As shown in FIG. 6, after the motor is started, the self-adaptive control unit starts to receive the external input signal and simultaneously starts the corresponding self-adaptive control program. Wherein, after starting, the difference determination unit 112 determines whether the feedback information (voltage or current signal) of the mover is input (step S601), if the feedback information of the mover is input into the difference determination unit, then proceed to step S602: extract the current waveform representing the current motion state of the mover from the feedback information; then, the current waveform is compared with the preset sine waveform (step S603), furthermore, the error signal output to the self-adaptive filtering unit 113 is generated according to the comparison result; the self-adaptive filtering unit 113 adjusts its filtering parameter according to the error signal and corrects the external input signal according to the filtering parameter (step S604). After the correction of the external input signal, it is further determined whether or not the corrected external input signal satisfies the requirement (step S605), that is, whether the corrected external input signal can sufficiently adjust the motion state of the mover to the preset state. If the requirement is satisfied, the process continues to wait for the next feedback information of the mover, and if the requirement is not satisfied, steps S602 to S605 are repeated, the "extraction-comparison-correction-determination" is carried out again by taking the corrected external input signal as the feedback information, until the corrected external input signal is sufficient to adjust the motion state of the mover to the preset state.

In addition, the self-adaptively controlled miniature motor provided by the present invention also comprises a flexible circuit board (FPCB) 7, both of the stator and the control chip 110 can be fixed on the flexible circuit board 7. The coil lead of the stator and the control chip are connected to the external circuit through the circuit on the flexible circuit board 7. The flexible circuit board 7 is fixed with the upper housing 1, and the back cover 2 can be fixed with the flexible circuit board 7 by means of snap joint. FPCB 7 connects the motor's internal circuit with the external circuit.

Similarly, the control chip 110 may also be fixed on the housing.

Figure 7:
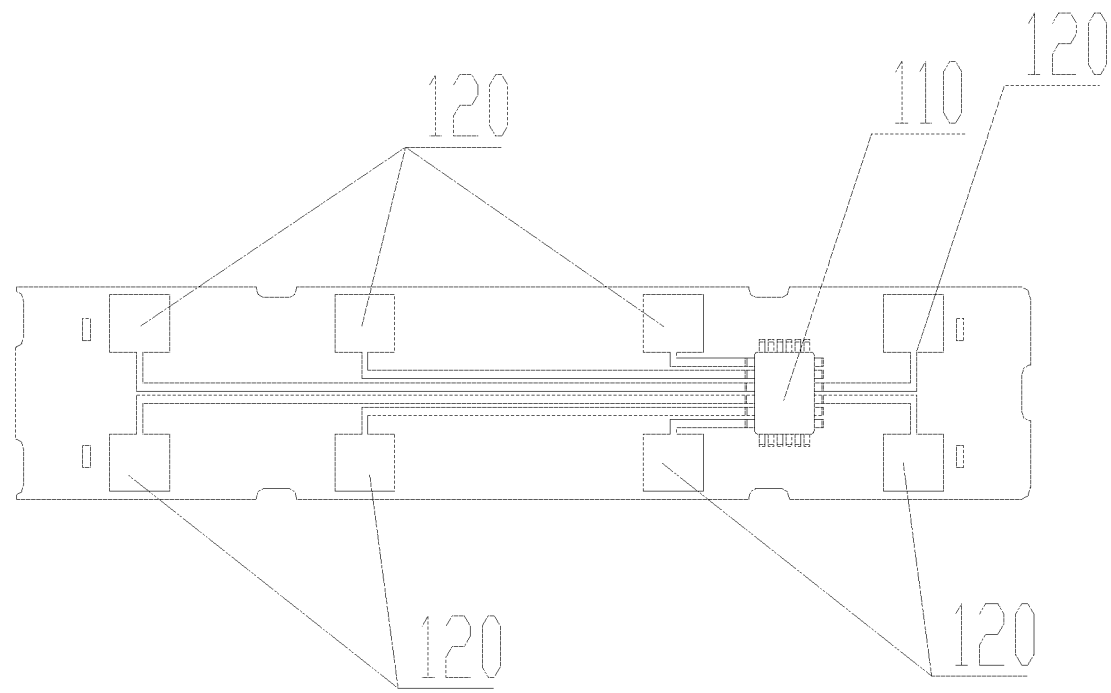
FIG. 7 is a circuit structure of a self-adaptive control unit according to an embodiment of the present invention.

FIG. 7 illustrates a circuit structure of a self-adaptive control unit according to an embodiment of the present invention;

As shown in FIG. 7, the self-adaptive control unit comprises a control chip 110 and a magnetic field force controllable unit 120. The magnetic field force controllable unit 120 may comprise a plurality of electromagnets or multi-turn coils uniformly distributed on the mover surface, and one control chip can control these electromagnets or multi-turn coils through a lead wire or circuit board. It should be noted that, the magnetic field force controllable unit 120 shown in FIG. 7 only shows a part thereof, and this part can be a movable part or a fixed part. That is to say, the magnetic field generated by a part of the magnetic field force controllable unit 120 (movable part/fixed part) is constant and invariant, and the part generating the invariant magnetic field is not shown in the embodiment shown in FIG. 7, and another part (fixed part/movable part) of the magnetic field force controllable unit 120 may generate a varying magnetic field under the control of the control chip 110 so as to adjust the action force between the fixed part and the movable part of the magnetic field force controllable unit 120.

Figure 8A:
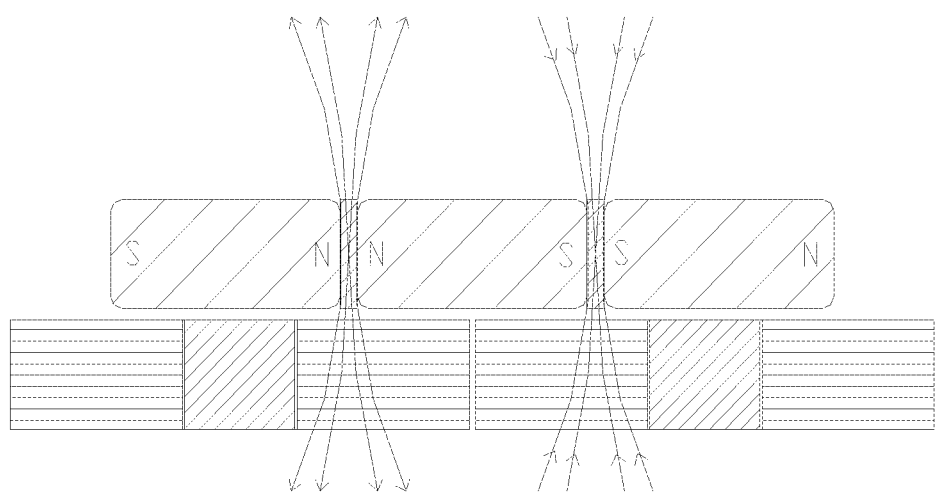
FIG. 8a and FIG. 8b each is a schematic diagram of a combined structure of a vibration block and a stator according to an embodiment of the present invention.
Figure 8B:
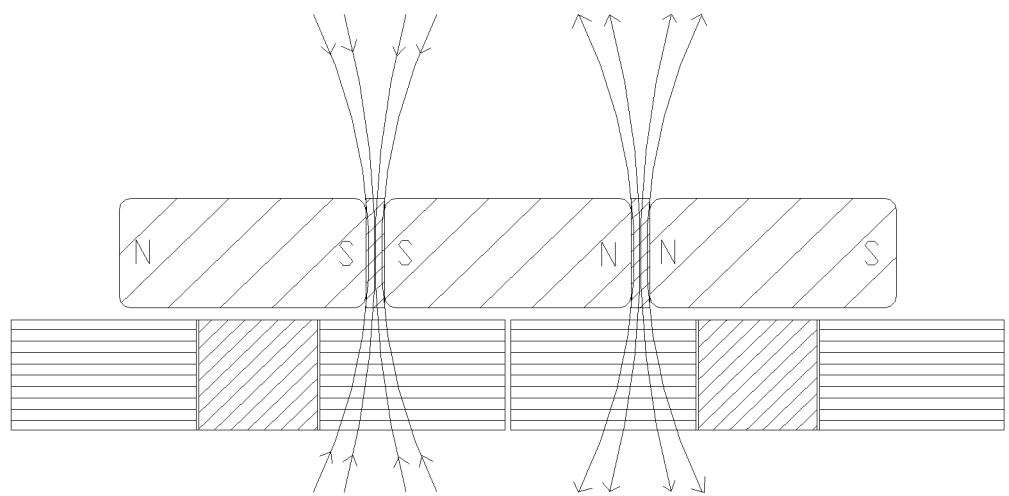

FIG. 8a and FIG. 8b illustrate a combined structure of a vibration block and a stator in the self-adaptively controlled miniature motor according to the present invention. As shown in FIGS. 8a and 8b, among the three permanent magnets disposed adjacent to each other, adjacent ends of the adjacent permanent magnets have the same polarity, i.e., presenting the sequence of S-N, N-S, S-N (as shown in FIG. 8a), or the sequence of N-S, S-N, N-S (as shown in FIG. 8b). The magnetic conductive yoke is disposed between the adjacent permanent magnets, and the magnetization direction of the permanent magnets is perpendicular to the axial direction of the coil of the stator. Since the repulsive force is generated between the two adjacent ends of two permanent magnets having the same polarity, the magnetic field line of the permanent magnets can concentratedly passes through the magnetic conductive yoke between two adjacent permanent magnets and the coil provided under the vibration block, thereby maximizing the magnetic flux passing through the coil.

Figure 9:
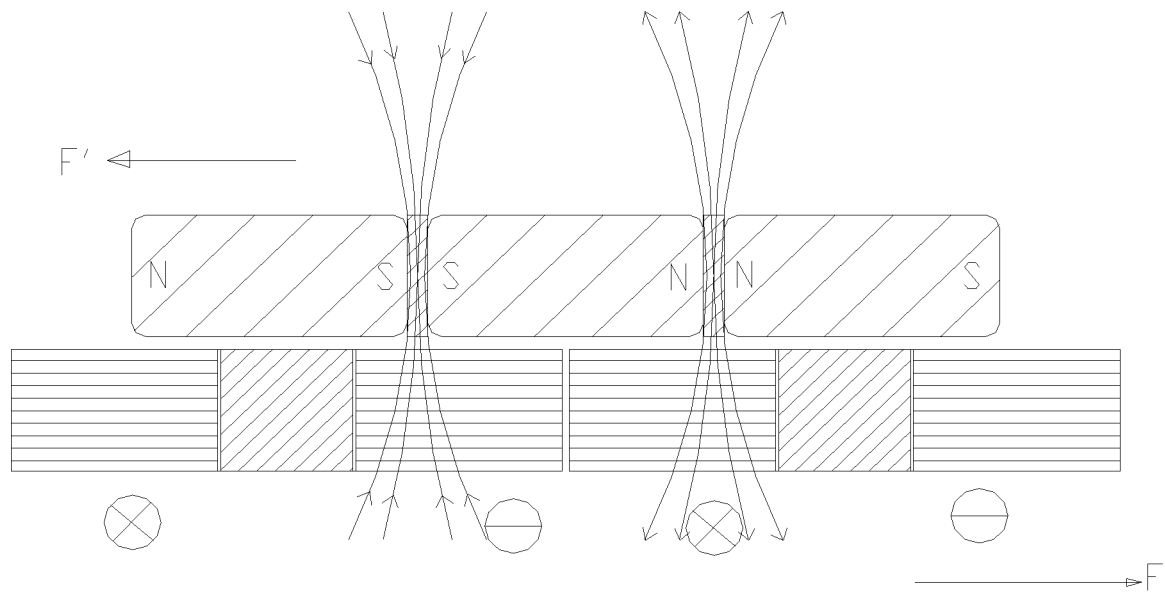
FIG. 9 is a schematic diagram of an operating principle according to an embodiment of the present invention.

The operation principle of the self-adaptively controlled miniature motor of the present invention will be briefly described below by taking FIG. 9 as an example. According to the left hand rule for determining the direction of the force that the energized conductor is subjected to in the magnetic field, the left hand is stretched out, so that the thumb is perpendicular to the remaining four fingers, and all of the fingers are in the same plane with the palm; then the magnetic induction lines enter into the centre of the palm and the four fingers point to the current direction, at this moment, the direction pointed by the thumb is the direction of the Ampere force that the energized conducting wire is subjected to in the magnetic field. It is assumed that the current direction in the coil which is indicated by "⊖" in the drawings is the inward direction perpendicular to the drawing plane, and the current direction in the coil which is indicated by "⊗" in the drawings is the outward direction perpendicular to the drawing plane. It is assumed that the first coil is "⊗ and ⊖", and the second coil must also be "⊗ and ⊖", in this way, the coils will all be subjected to the rightward force F. Since the coil is fixed immovably, based on the relationship between the action force and the reaction force, the permanent magnet is subjected to the leftward force F'. In this way, the permanent magnet, which is pushed to the left by the leftward force, drives the counterweight block together to move to the left, so as to squeeze the spring on the left side of the counterweight block and stretch the spring on the right side of the counterweight block. Similarly, when the current direction is changed, the magnetic field force F that the coil is subjected to is the leftward force according to the left-hand rule. But since the coil is fixed immovably, the permanent magnet is subjected to the force F' which has a direction opposite to the direction of the force F and has the same magnitude as the force F. The permanent magnet, which is pushed to the right by the rightward force, drives the counterweight block together to move to the right. At the same time, the springs at the two ends of the counterweight block will continue to be stretched/squeezed after being restored to its original state from the state of squeezing/stretching. The above-mentioned motions are carried out alternately, so that the vibration block composed of the permanent magnet and the magnetic conductive yoke and the vibrator formed by the counterweight block reciprocate in a direction parallel to the mounting plane of the stator.

It can be seen from the above principle that the control chip is used to control the energized direction and magnitude of the magnetic field force controllable unit in the self-adaptively controlled miniature motor, the phase and magnitude of the electric current in the magnetic field force controllable unit can be adjusted in real time according to the motion state of the mover. So that the driving force that the mover is subjected to will not change with the change of the position of the reciprocating movement, thereby balancing the force of the vibrator and obtaining a relatively balanced vibration sense.

In the above embodiment, the vibration block comprises three permanent magnets, but is not limited to the above structure in the specific application process. The number of permanent magnets constituting the vibration block may also be appropriately selected according to the magnitude of the vibration force required for the application products, for example, more permanent magnets or a combined structure of a vibration block consisting of two permanent magnets and a stator shown in FIG. 10a or 10b may be provided.

Figure 10A:
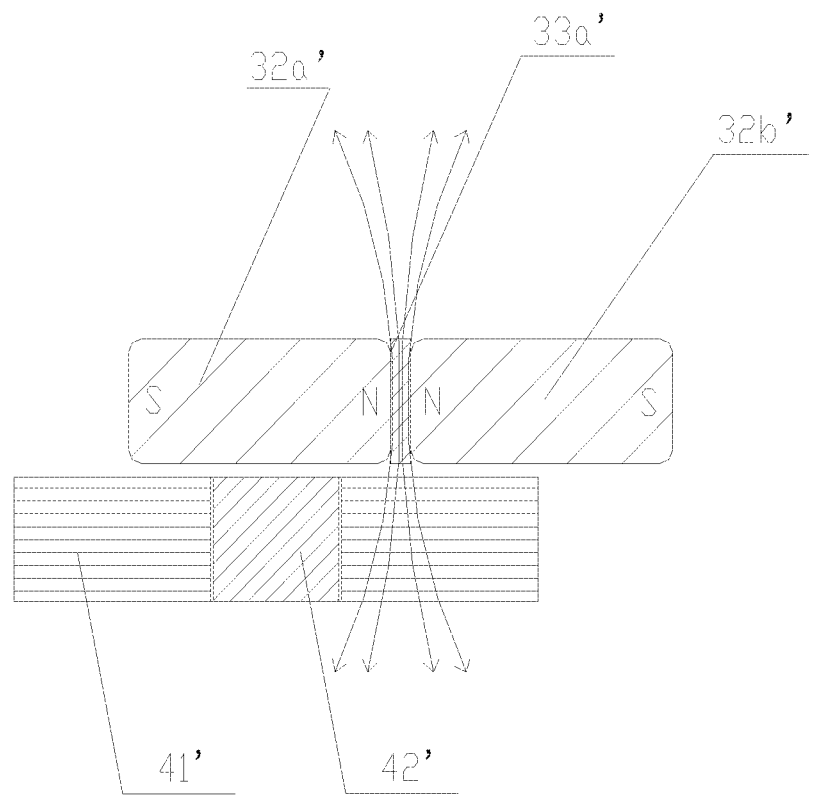
FIG. 10a and FIG. 10b each is a schematic diagram of a combined structure of a vibration block and a stator according to another embodiment of the present invention.
Figure 10B:
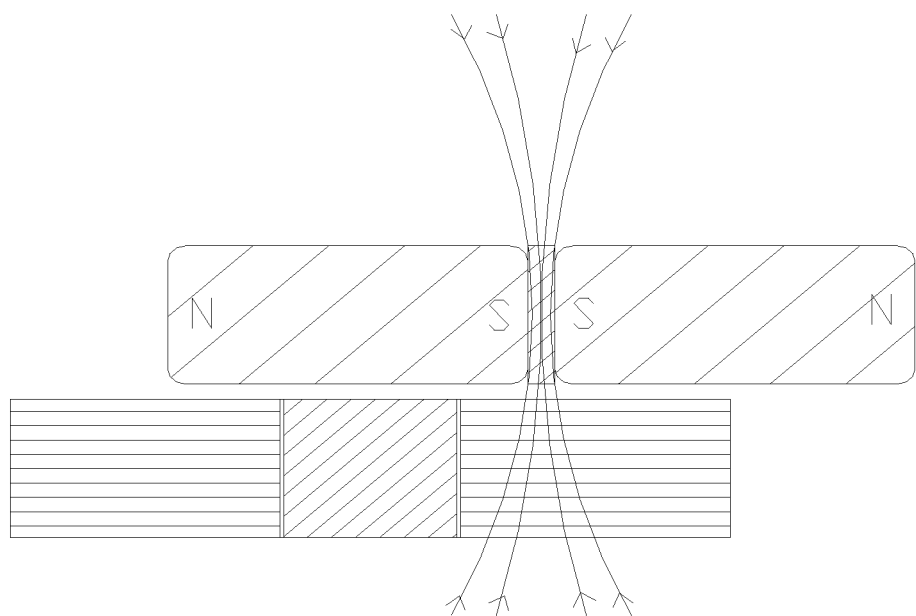

As shown in FIGS. 10a and 10b, the vibration block comprises two permanent magnets 32a' and 32b' disposed adjacent to each other, and the adjacent ends of the two permanent magnets have the same polarity. A magnetic conductive yoke 33a' is arranged between the two permanent magnets 32a', 32b'. The stator composed of the coil 41' and the magnetic conductive core 42' disposed in the coil 41' is disposed under the vibration block, and the magnetic conductive yoke 33a' and the magnetic conductive core 42' are misaligned.

In the above embodiments, the magnets in the vibration block are permanent magnets, and electromagnets may also be used as the magnets in the vibration block. When the magnet in the vibration block is an electromagnet, the control chip and the electromagnet in the vibration block may also be electrically connected by a lead wire to control the current direction and current magnitude of the electromagnet in the vibration block by the control chip, thus making real-time adjustment according to the vibration state of the mover.

In the embodiment shown in FIGS. 1 and 2, the vibration block is embedded and fixed in the counterweight block to drive the counterweight block to vibrate horizontally. Specifically, an avoiding structure for avoiding the stator is arranged in the middle portion of the counterweight block, and a groove for accommodating the vibration block is arranged at a central position of the avoiding structure on the counterweight block. In a specific assembly process, the permanent magnets and the magnetic conductive yoke consisting of the vibration block may be firstly fixed together, and then the vibration block as a whole may be fixed in the groove by means of glue coating or laser welding, etc.

In addition, the self-adaptively controlled miniature motor of the present invention further comprises two vibration guiding shafts, limit springs and limit blocks disposed at two ends of the counterweight block 31, and the limit springs are sleeved on the vibration guiding shafts 51a, 51b. In the embodiment shown in FIGS. 1 and 2, the limit blocks 53a, 53b are respectively fixed on the upper housing 1, two vibration guiding shafts 51a, 51b are respectively fixed on two ends of the counterweight block 31, and the limit blocks 53a, 53b are further provided with the guiding holes for reciprocating movement of the vibration guiding shafts. In this way, under the action of the magnetic field generated by the stator after being energized, the vibration blocks drive the counterweight block 31 and the vibration guiding shafts 51a, 51b fixed at the two ends of the counterweight block 31 to vibrate within the limited range of the guiding hole.

Wherein, the limit springs 52a, 52b respectively sleeved on the vibration guiding shafts 51a, 51b are respectively defined between the counterweight block 31 and the corresponding limit blocks 53a, 53b to provide elastic restoring force for the vibration of the vibrator.

In addition, in order to reduce the frictional force between the vibration guiding shafts and the guiding holes and improve the product quality, the shaft sleeves 54a, 54b may also be sleeved on one end of the vibration guiding shafts penetrating into the guiding holes, and the contact surfaces of the shaft sleeves and the guiding holes are smooth and wear resistant. The addition of the shaft sleeves reduces the contact area of the vibration guiding shafts with the guiding holes. Moreover, the shaft sleeves can be made of high density, surface smooth and wear-resistant material, and the frictional force between the vibration guiding shafts and the guiding holes can be reduced as much as possible without increasing the cost so as to improve the degree of lubrication.

As another embodiment of the present invention, the limit blocks may also be fixed at the two ends of the counterweight block, or the counterweight block and the limit blocks may be designed as an integral structure. The limit blocks are provided with guiding holes for the reciprocating motion of the vibration guiding shafts. The two vibration guiding shafts are respectively fixed on the upper housing, and the shaft sleeves are sleeved on one end of the vibration guiding shafts acting on the guiding holes (here, one end close to the counterweight block). In this way, under the action of the magnetic field generated by the stator after being energized, the vibration block drives the counterweight block and the limit blocks fixed at the two ends of the counterweight block to vibrate within the limited range of the guiding holes.

Apparently, The amplitude of vibration of the vibrator determines the depth at which the vibration guiding shafts penetrate into the guide holes, the distance between the end of the vibration guiding shaft penetrating into the guiding hole and the bottom end of the guiding hole, and the distance between the edge of the avoiding structure and the outer edge of the stator. In the embodiments shown in FIG. 1, FIG. 2, and FIG. 3 and FIG. 4, the horizontal distance d between the magnetic conductive yoke and the magnetic conductive core corresponding to the magnetic conductive yoke is within a numerical range of [0.1 mm, 0.3 mm], that is, the horizontal distance of the center line of each of the magnetic conductive yokes be apart from the center line of the magnetic conductive core of the corresponding (that is, the nearest) stator is 0.1~0.3 mm, then correspondingly, the depth at which the vibration guiding shafts penetrate into the guide holes, the distance between the end of the vibration guiding shaft penetrating into the guiding hole and the bottom end of the guiding hole, and the distance between the edge of the avoiding structure and the outer edge of the stator all should be slightly larger than 0.2 mm.

In order to optimize the control of the vibration balance inside the motor, it is also possible to add a magnetic balance mechanism inside the motor, for example, the magnetic balance mechanism may comprise a pair of first balance magnets 61a, 61b respectively disposed on vertical side walls of both ends of the counterweight block 31, and a pair of second balance magnets corresponding to the first balance magnets 61a, 61b provided on the housing at positions corresponding to the ends of the counterweight block 31 respectively. And the second balance magnets 62a, 62b and the corresponding first balance magnets 61a, 61b attract each other.

Since two pairs of first balance magnets 61a, 61b are respectively fixed on two ends of the balance weight 31, and two pairs of second balance magnets mutually attracted with two pairs of first balance magnets 61a, 61b are respectively fixed on the inner wall of the housing, that is, two pairs of magnets capable of giving the positioning attraction to the two ends of the vibrator vibrating in the vibration space are fixedly provided on the housing at the two ends of the vibration space, so, in the vibration process of the vibrator, the four corners of the vibrator will be subject to the directional attraction of the four corresponding corners of the vibration space, thus providing the magnetic balance guidance for the vibration of the vibrator in the vibration space. This magnetic balance guidance will not be deformed, will not generate wear, and has higher accuracy and stability compared with the existing mechanical balance guidance methods.

As the first balance magnets and the second balance magnets in the above-mentioned magnetic balance mechanism, permanent magnets, electromagnets or any combination of permanent magnets and electromagnets may be adopted, for example, all of the first balance magnets and the second balance magnets adopt the permanent magnets or adopt the electromagnets; or the first balance magnets adopt the electromagnets and the second balance magnets adopt the permanent magnets; or the first balance magnets adopt the permanent magnets, and the second balance magnets adopt the electromagnets.

Similarly, when the magnet in the magnetic balance mechanism is an electromagnet, the magnet in the magnetic balance mechanism may also be electrically connected with the chip via a lead wire, so as to control the direction and magnitude of the current of the magnet in the magnetic balance mechanism by the chip, thus adjusting the force balance of the vibration block during the vibration process.

The self-adaptively controlled miniature motor according to the present invention is described as above in an exemplary manner with reference to the drawings. However, those skilled in the art should understand that various modifications may be made to the self-adaptively controlled miniature motor of the present invention as described above without departing from the scope of the present invention. Therefore, the protection scope of the present invention should be determined by the contents of the appended claims.

The invention claimed is:

1. A self-adaptively controlled miniature motor, comprising a driving unit and a mover, wherein the driving unit comprises a fixed stator and a movable vibration block, and a driving force for a reciprocating motion is provided for the mover through an interaction force between the stator and the vibration block; the mover is a forced vibration part, and does the reciprocating motion driven by the movable vibration block of the driving unit, wherein the self-adaptively controlled miniature motor further comprises a self-adaptive controller for controlling a motion state of the mover in real time by adjusting a force applied on the mover, according to a feedback information of the motion state of the mover, wherein the self-adaptive controller comprises a control chip and a magnetic field force controller, wherein, the control chip is used for adjusting and controlling an external input signal according to the feedback information of the motion state of the mover and determining a real-time control signal output to the magnetic field force controller; and the magnetic field force controller is used for providing a real-time controlled force for the mover under the control of the control signal, wherein the control chip comprises:

a feedback signal collector, for collecting a voltage signal or a current signal fed back from the mover;

a difference determination part, for determining an error signal for adjusting the motion state of the mover according to the signal collected by the feedback signal collector;

a self-adaptive filter, for self-adaptively filtering the external input signal according to the error signal determined by the difference determination part; and a power amplifier, for performing power amplifying to the signal filtered by the self-adaptive filter to output the real-time control signal to the magnetic field force controller, wherein the difference determination part determines the error signal by taking the feedback information of the motion state of the mover as an input signal, extracting a current waveform representing a current motion state of the mover in the input signal, comparing the current waveform with a preset sine waveform, and generating the error signal based on the difference between the current waveform and the present sine waveform.

2. The self-adaptively controlled miniature motor according to claim 1, wherein in a process that the difference determination part and the self-adaptive filter determine the error signal for adjusting the motion state of the mover according to the signal collected by the feedback signal collector and perform self-adaptive filtering for the external input signal according to the error signal determined by the difference determination part, the process comprises four stages of "extraction-comparison-correction-determination", the self-adaptive filter adjusts a filtering parameter thereof according to the error signal and corrects the external input signal according to the filtering parameter;

after the external input signal is corrected, it is determined whether the corrected external input signal is sufficient to adjust the motion state of the mover to a preset state, if the corrected external input signal is not sufficient to adjust the motion state of the mover to the preset state, the process comprising "extraction-comparison-correction-determination" is carried out again by taking the corrected external input signal as the feedback information of the motion state of the mover, until the corrected external input signal is sufficient to adjust the motion state of the mover to the preset state.

3. The self-adaptively controlled miniature motor according to claim 1, wherein
the control chip is a built-in circuit or a peripheral circuit of the self-adaptively controlled miniature motor.

4. The self-adaptively controlled miniature motor according to claim 1, wherein
the magnetic field force controller comprises a movable part and a fixed part for applying a force on the movable part, wherein
the movable part is coupled with the mover and does the reciprocating motion together with the mover, and the fixed part is stationary with respect to the stator.

5. The self-adaptively controlled miniature motor according to claim 4, wherein
the movable part is a permanent magnet, an electromagnet or a multi-turn coil that is fixedly coupled with the mover.

6. The self-adaptively controlled miniature motor according to claim 1, wherein
the vibration block comprises at least two permanent magnets disposed adjacent to each other and a magnetic conductive yoke disposed between any two adjacent permanent magnets, and adjacent ends of two adjacent permanent magnets have the same polarities;
the stator comprises a coil and a magnetic conductive core provided in the coil; and
a magnetization direction of the permanent magnets is perpendicular to an axial direction of the coil.

7. The self-adaptively controlled miniature motor according to claim 6, wherein
the magnetic conductive yoke and the magnetic conductive core are misaligned; and
a horizontal distance d between the magnetic conductive yoke and the magnetic conductive core corresponding to the magnetic conductive yoke is within a numerical range of 0.1 mm to 0.3 mm.

8. The self-adaptively controlled miniature motor according to claim 1, wherein
the stator and the vibration block are arranged in a vertical direction, and a vibration direction of the vibration block is parallel to a mounting plane of the stator.

9. The self-adaptively controlled miniature motor according to claim 6, wherein
the stator and the vibration block are arranged in a vertical direction, and a vibration direction of the vibration block is parallel to a mounting plane of the stator.

10. A self-adaptively controlled miniature motor, comprising a driving unit and a mover, wherein the driving unit comprises a fixed stator and a movable vibration block, and a driving force for a reciprocating motion is provided for the mover through an interaction force between the stator and the vibration block; the mover is a forced vibration part, and does the reciprocating motion driven by the movable vibration block of the driving unit, wherein
the self-adaptively controlled miniature motor further comprises a self-adaptive controller for controlling a motion state of the mover in real time by adjusting a force applied on the mover, according to a feedback information of the motion state of the mover,
wherein the self-adaptive controller comprises a control chip and a magnetic field force controller, wherein,
the control chip is used for adjusting and controlling an external input signal according to the feedback information of the motion state of the mover and determining a real-time control signal output to the magnetic field force controller; and
the magnetic field force controller is used for providing a real-time controlled force for the mover under the control of the control signal,
wherein the control chip comprises:
a feedback signal collector, for collecting a voltage signal or a current signal fed back from the mover;
a difference determination part, for determining an error signal for adjusting the motion state of the mover according to the signal collected by the feedback signal collector;
a self-adaptive filter, for self-adaptively filtering the external input signal according to the error signal determined by the difference determination part; and
a power amplifier, for performing power amplifying to the signal filtered by the self-adaptive filter to output the real-time control signal to the magnetic field force controller, wherein
the vibration block comprises at least two permanent magnets disposed adjacent to each other and a magnetic conductive yoke disposed between any two adjacent permanent magnets, and adjacent ends of two adjacent permanent magnets have the same polarities;
the stator comprises a coil and a magnetic conductive core provided in the coil; and
a magnetization direction of the permanent magnets is perpendicular to an axial direction of the coil.

11. The self-adaptively controlled miniature motor according to claim 10, wherein
the magnetic conductive yoke and the magnetic conductive core are misaligned; and
a horizontal distance d between the magnetic conductive yoke and the magnetic conductive core corresponding to the magnetic conductive yoke is within a numerical range of 0.1 mm to 0.3 mm.

12. The self-adaptively controlled miniature motor according to claim 10, wherein
the stator and the vibration block are arranged in a vertical direction, and a vibration direction of the vibration block is parallel to a mounting plane of the stator.

* * * * *